May 6, 1958 W. E. LARGE 2,833,978
CURRENT REGULATOR
Filed April 27, 1953 3 Sheets-Sheet 1

Fig. 1A.

WITNESSES:
E. A. McCloskey.
Leon M. Garman

INVENTOR
William E. Large.
BY
Hymen Diamond
ATTORNEY

Fig. IC.

United States Patent Office 2,833,978
Patented May 6, 1958

2,833,978

CURRENT REGULATOR

William E. Large, Lancaster, N. Y., assignor to Westinghouse Electric Corporation, East Pittsburgh, Pa., a corporation of Pennsylvania Application April 27, 1953, Serial No. 351,338

18 Claims. (Cl. 323—18)

My invention relates to electric discharge apparatus and has particular relation to regulating apparatus for power which is supplied during intermittent intervals of predetermined duration. Such regulating apparatus is used in connection with high precision welding apparatus in which the welding current is supplied during intermittent intervals.

In regulator apparatus of this type the regulation is commonly effected by producing an error signal which is impressed on the power supply apparatus to produce the necessary correction. The error signal is derived by comparing in one way or another a voltage dependent on the power to be regulated and a standard voltage which may be set to correspond to the desired magnitude of the power. Regulator apparatus constructed and operated in accordance with the teachings of the prior art has not been entirely satisfactory. The principal deficiency of this apparatus has been that it failed to yield the precise regulation which is demanded of such apparatus.

It is accordingly broadly an object of my invention to provide regulator apparatus which shall control precisely power which is supplied intermittently.

My invention in its broader aspects arises from the realization that where power is supplied intermittently, the signal dependent on the power which determines the error signal must be built up at the beginning of each intermittent interval. The dependent potential then varies from a relatively low magnitude to the magnitude corresponding to the normal power magnitude. The variation introduces changes in the error signal which change the power to be regulated in an undesired manner. While such changes occur only at the beginnings of the intermittent intervals, their influence from a practical standpoint is important because the intervals are customarily relatively short, of the order of a few periods of a commercial power supply, and the variations at the beginnings of the intervals represent a large proportion of the total power supplied.

It is accordingly a more specific object of my invention to provide regulator apparatus for power supplied intermittently which shall not introduce undesired variations at the beginnings of the intermittent intervals during which the power is supplied.

A specific object of my invention is to provide a novel balanced network.

Another specific object of my invention is to provide a novel flip-flop circuit.

A further specific object of my invention is to provide a novel electronic circuit for producing instantaneous operation of a relay.

A still further specific object of my invention is to provide a novel circuit conceived to compare a potential signal derived from power to be regulated with a standard potential signal.

Like prior art apparatus, apparatus in accordance with my invention includes a network for deriving a potential dependent on the power to be regulated which is usually supplied intermittently and a standard potential network. These networks are connected to vary the output of a balanced network, such as a Wheatstone bridge. The output of the balanced network supplies the error signal which controls the power. In accordance with my invention, I provide means for blocking the potential which is dependent on the power to be regulated and the balanced network for a short time interval following the transmission of the signal which times the power. This interval is adequate to enable the signal potential dependent on the power to be regulated to rise to a magnitude corresponding to the normal desired magnitude of this power.

This object is accomplished by the cooperation of a novel flip-flop circuit which is actuable to pass from a first, or stand-by, condition to a second, or operating condition when the timing signal is initiated. The output terminals of this flip-flop circuit are connected so that the potential dependent on the power to be regulated and the output of the balanced network are blocked in the first condition of the flip-flop circuit and are unblocked in the second condition of the flip-flop circuit.

The balanced network provided in accordance with my invention is also of novel structure. Novelty is involved in the manner in which it is conceived to respond to the flip-flop circuit. In addition it includes means for retaining the effect of an error signal produced during one of a series of intervals during which power is transmitted so that it may be impressed during a succeeding interval. This feature of the network is advantageous in seam welders.

In power supply apparatus of the type involved in my invention, the magnitude of the power supply may be changed at one or more instants during an interval during which it flows. Thus where the power is supplied for welding purposes, it may be maintained at one magnitude during a pre-heat interval, at a second magnitude during a weld interval, and at a third magnitude during a post-heat interval. So that the regulation may take effect for each phase of the power supply interval, I provide a novel instantaneously operative relay circuit which resets the regulating apparatus during the power supply intervals at the instants when the magnitude of the power supply is to change.

The novel features that I consider characteristic of my invention are set forth generally above. The invention itself both as to its organization and its method of operation, together with additional objects and advantages thereof, will be understood from the following description of a specific embodiment when read in connection with the accompanying drawings, in which:

Description

Figure 1A:
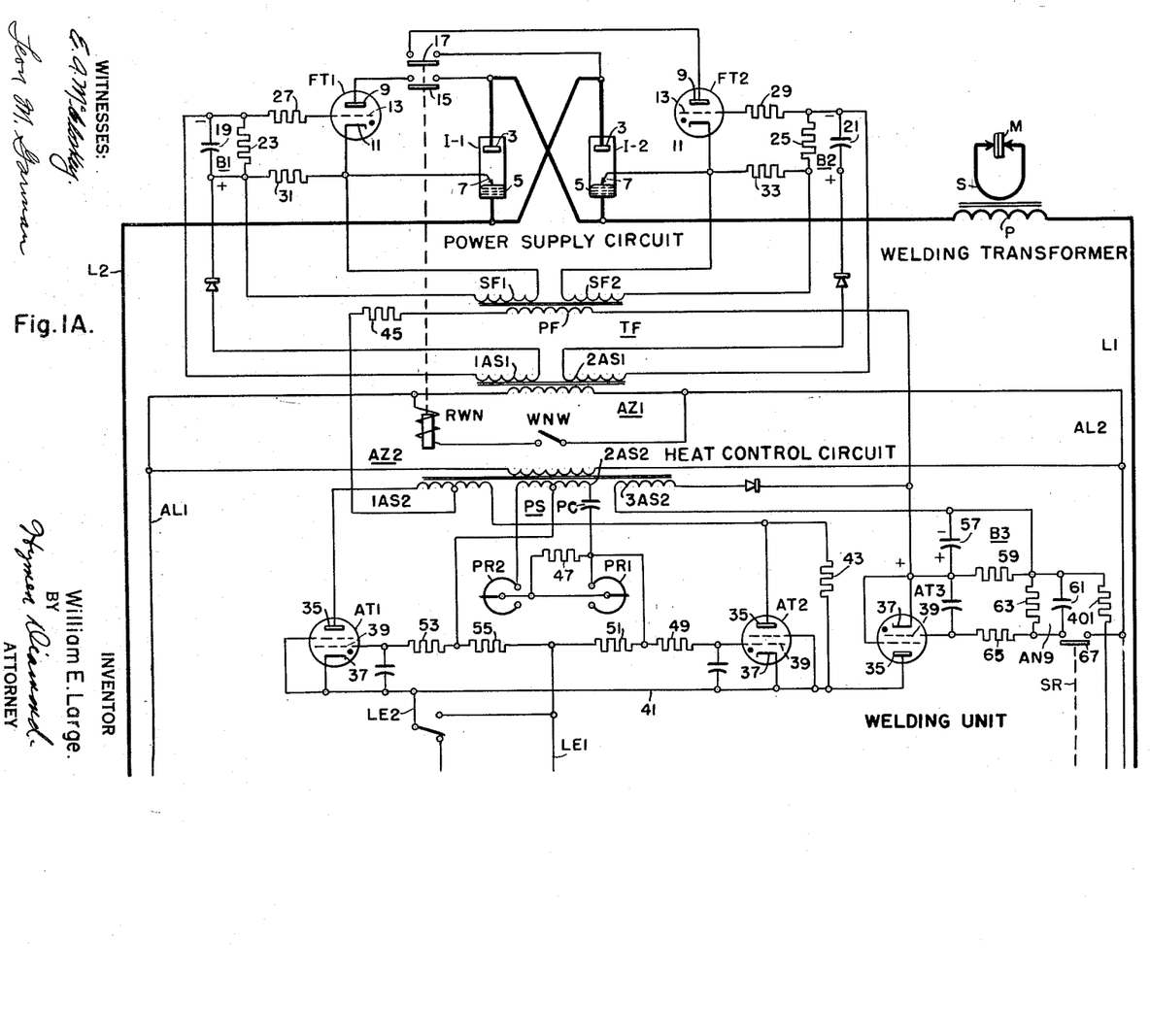
Figures 1A, 1B and 1C together constitute a circuit diagram of my invention.
Figure 1B:
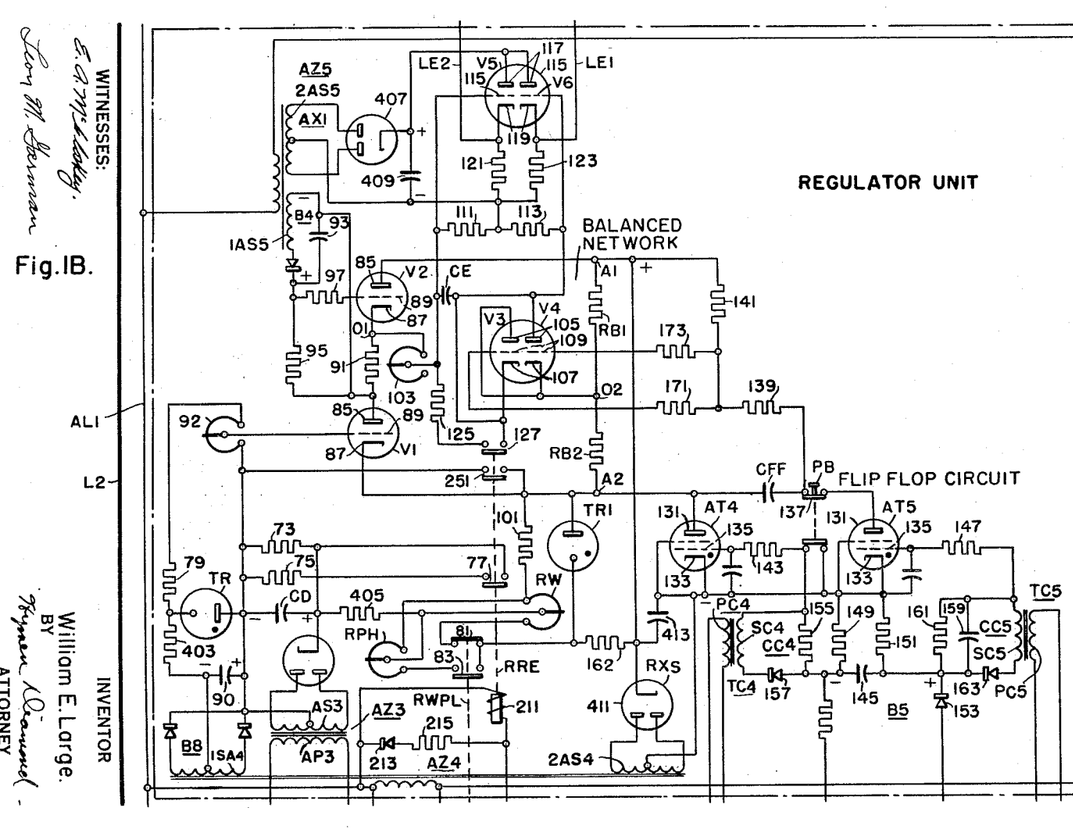
Figure 1C:
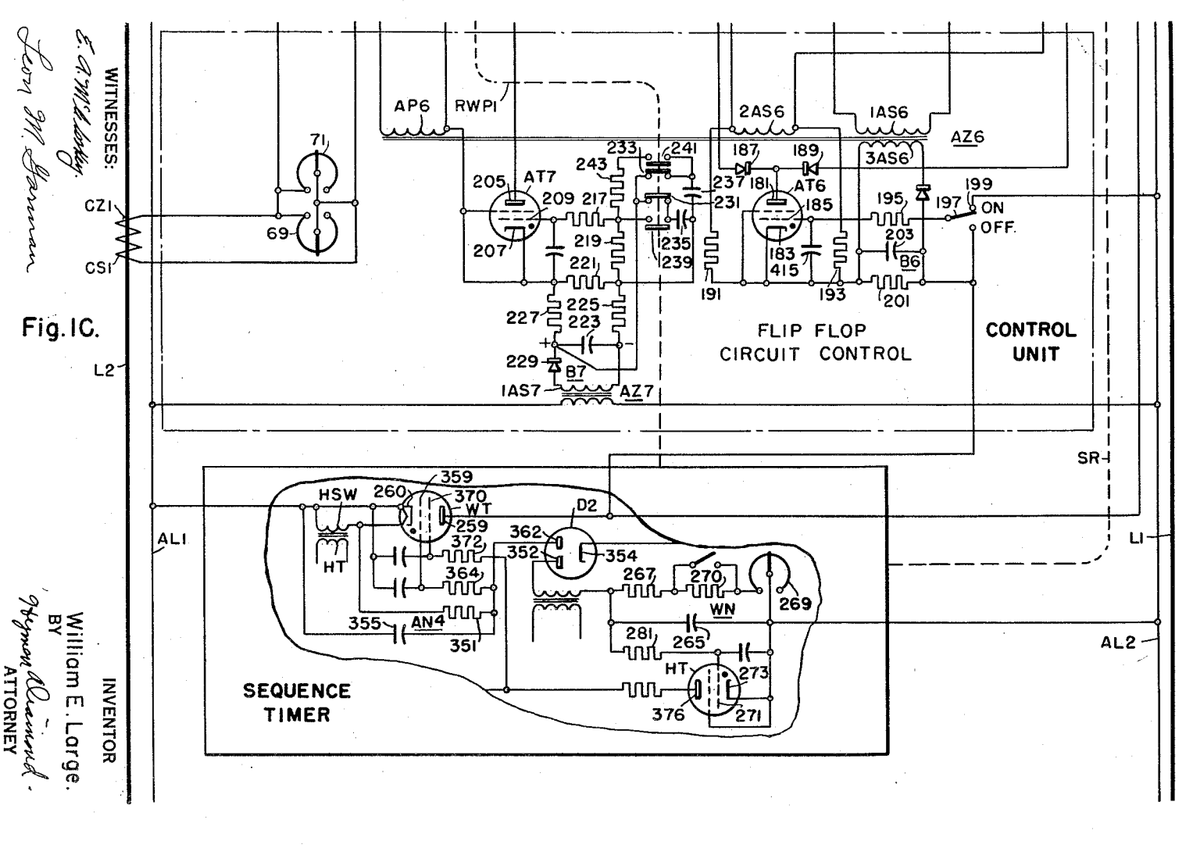

My invention is illustrated as applied to welding apparatus and includes a Welding Unit, a Regulator Unit, a Control Unit and a Sequence Timer. This apparatus is supplied from main conductors or buses L1 and L2 which may be the buses of a commercial 60 cycle supply and from auxiliary buses or conductors AL1 and AL2 which may derive their power from the main buses L1 and L2 through a supply transformer (not shown).

The Welding Unit includes a welding transformer, a power supply circuit and a heat control circuit. The welding transformer has a primary P and a secondary S, the latter is connected across the material M to be welded. The primary P is connected in the power supply circuit to the conductors L1 and L2 through a pair of electric discharge devices I-1 and I-2, such as ignitrons. Each ignitron has an anode 2, a cathode 5, and an igniter 7. With each ignitron I-1 and I-2, a firing thyratron FT1 and FT2 respectively is associated. Each firing thyratron has an anode 9, a cathode 11 and a control electrode 13. The anode 9 of each thyratron FT is connected to the anode 3 of the associated ignitron I through a corresponding contact 15 and 17 respectively of a weld-no-weld relay RWN. The cathode 11 of each thyratron FT is connected directly to the igniter 7 of its associated ignitron I.

Each firing thyratron FT1 and FT2 is maintained nonconductive in the quiescent or standby condition of the apparatus by a biasing network B1 and B2 respectively. These networks derive their power from an auxiliary transformer AZ1 energized from the auxiliary buses AL1 and AL2. The biasing potential is impressed across a capacitor 19 and 21 respectively shunted by a resistor 23 and 25 respectively in each circuit B1 and B2. The capacitor resistor networks 19—23, 21—25 are connected respectively between the control electrode 13 and cathode 11 of the associated thyratron FT through a grid resistor 27 and 29 and a cathode resistor 31 and 33.

Potential to counteract the bias (B1, B2) is impressed across the cathode resistor 31 and 23 of each firing thyratron from the associated secondaries SF1 and SF2 of a transformer TF which may be called the firing transformer. The primary PF of this transformer is connected to the heat control circuit and is supplied from auxiliary thyratrons AT1, AT2, AT3 in this circuit. Each of the auxiliary thyratrons AT has an anode 35, a cathode 37 and a control electrode 39. The anode 35 of one of the auxiliary thyratrons AT1 is connected to one terminal of the secondary 1AS2 of an auxiliary transformer AZ2 energized from the buses AL1 and AL2, and the anode 35 of another of the auxiliary thyratrons AT2 is connected to another terminal of this secondary 1AS2. The cathode 37 of these auxiliary thyratrons AT1 and AT2 are connected together to a common conductor 41 which is connected to the anode 35 of the third auxiliary thyratron AT3. A resistor 43 is connected between the anode 35 of one auxiliary thyratron AT2 and this conductor 41. The cathode 37 of the third thyratron AT3 is connected to an intermediate tap of the secondary AS2 through the primary PF of the firing transformer TF and a resistor 45.

The thyratrons AT1 and AT2 are controlled from a phase-shift circuit PS. This circuit derives its power from another secondary 2AS2 from transformer AZ2 and includes a capacitor PC and a pair of variable resistors PR1 and PR2 which are connected in series across the secondary 2AS2. One of the variable resistors PR1 is shunted by resistor 47. The junction of the capacitor PC and the resistor PR1 is connected to the junction of a grid resistor 49 connected to the control electrode 39 of thyratron AT2 and another resistor 51 and the intermediate tap of the secondary 2AS2 is connected to the junction of corresponding resistors 53 and 55 connected to the control electrode 39 of thyratron AT1.

The potential signal for correcting the power supplied by the Welding Unit is transmitted through a pair of conductors LE1 and LE2. One of these conductors LE1 is connected to the junction of the resistors 51 and 55 and the other conductor LE2 is connected to the common conductor 41 to which the cathodes 37 are connected.

The other auxiliary thyratron AT3 is biased to nonconductivity by bias B3 from another secondary 3AS2 of the transformer AZ2 and impressed across a network consisting of a capacitor 57 in parallel with a resistor 59. This network B3 is connected directly to the cathode 37 of the auxiliary thyratron AT3 at one terminal and at the other terminal it is connected to the control electrode 39 through a time constant network AN9, consisting of a resistor 63 in parallel with a capacitor 61, and through a grid resistor 65.

It is seen that the third auxiliary thyratron AT3 is in series with the other auxiliary thyratrons AT1 and AT2 and the latter can conduct only when the third thyratron AT3 is conductive. The third thyratron is rendered conductive by operation of the Sequence Timer during the intervals during which current is to flow through the primary P of the welding transformer by the closing of a contact 67 of the starting relay SR of the Sequence Timer. The other auxiliary thyratrons AT1 and AT2 are adapted to be rendered conductive during this interval at instants predetermined by the setting of the phase shift network PS and by the magnitude of a direct-current potential derived from the conductors LE1 and LE2 which transmit the error signal.

The Regulator Unit includes a network for producing a potential dependent on the welding current, a second network for producing a standard potential with which the first potential is compared, a balanced network and a flip-flop circuit.

The dependent potential is derived from one of the supply buses L2 through a current transformer CZ1, the output of the secondary CS1 of which is impressed across variable resistors 69 and 71 in parallel with the primary AP3 of a transformer AZ3. The secondary AS3 of this transformer is connected in a full-wave rectifier circuit across a capacitor CD shunted by a resistor 73. The capacitor may also be shunted by a second resistor 75 of low magnitude which may be connected across it through one of the normally open contacts 77 of a reset relay RRE.

The standard potential is derived from a network consisting of a fixed resistor 101 and either one or the other of a pair of variable resistors RW and RPH which are selectively connected in series with the fixed resistor through normally closed contact 81 or normally open contact 83 of the weld-post-heat relay RWP1 actuated by the Sequence Timer. The standard potential network is supplied with power from a rectifier RXS through the flip-flop circuit, and through a resistor 162 which connects the positive terminal of the rectifier to one terminal of the network. When the flip-flop circuit is in the operating condition, the negative terminal of the rectifier RXS is connected to the resistor 101 of the network. The standard potential is maintained at a predetermined selected magnitude by a regulator TR1. The rectifier RXS is supplied from a secondary 2AS4 of transformer AZ4 which is energized from the buses AL1 and AL2.

The standard potential and the welding current dependent potential are compared by means of a balanced network. This network is composed principally of a plurality of impedance arms connected in a closed loop. The impedance in two of the arms is provided by electric discharge paths V1 and V2 each defined by an anode 85 and a cathode 87 and having a control electrode 89. The impedance in each of the other two arms is composed of a resistor RB1 and RB2. The cathode 87 of one of the discharge paths V2 is connected to the anode 85 of the other through a resistor 91. The anode 85 of the former discharge path V2 is connected to one of the resistors RB1 and the cathode 87 of the other path V1 is connected to the other resistor RB2.

A bias B4 is connected in the control current of the path V2. The bias B4 is derived from the secondary 1AS5 of another transformer AZ5 supplied from the bus AL1 and AL2 which impresses a potential across a capacitor 93 having a resistor 95 in parallel therewith. This capacitor-resistor network is connected to the control electrode 89 of the path V2 through a grid resistor 97 and to the cathode 87 of the path through the resistor 91 in series with the anode of the other path V1.

The potential of the control electrode 89 of path V1 is in part determined by a zero-adjustment bias network B8. This network is supplied from a secondary 1AS4 of transformer AZ4 through a rectifier circuit including capacitor 90. This capacitor 90 is shunted by a regulator tube TR designed to maintain the capacitor voltage at a predetermined level. A variable resistor 92 is connected across the regulator tube TR in series with a fixed resistor 79. The variable resistor 92 is set to assure that the path V1 operates at the proper point on its characteristic. The control electrode 89 of the path V1 is connected to its cathode 87 through the variable resistor 92, the capacitor CD of the welding current dependent network (or the fixed resistor 73), a portion of the variable resistors RW and RPH, and the fixed resistor 101.

The balanced network has a pair of input terminals A1 and A2 across which a potential is impressed and a pair of output terminals O1 and O2 from which a potential is derived. The input terminals A1 and A2 are supplied through the flip-flop circuit from rectifier circuit RXS. The positive terminal of this supply RXS is connected to input terminal A1; the negative terminal of the source RXS is adapted to be connected to the input terminal A2 through the flip-flop circuit when it is in operating condition. Between the output terminals O1 and O2 there are connected in series, a variable resistor 103, a capacitor CE (the error capacitor) and a pair of discharge paths V3 and V4 each defined by an anode 105 and a cathode 107 and having a control electrode 109 in anti-parallel. The capacitor CE is shunted by a pair of resistors 111 and 113 and its terminals are connected to the control electrodes 115 of another pair of discharge paths V5 and V6, each having, in addition to the control electrode 115, an anode 117 and a cathode 119. These discharge paths V5 and V6 are connected in cathode-follower circuit, a load resistor 121 and 123 being connected to the cathode 119 of each. The load resistors 121 and 123 terminate in a common connection which is the junction of the two resistors 111 and 113 in parallel with the capacitor CE. The cathodes 119 of the discharge paths V5 and V6 are connected each to one of the conductors LE2 and LE1 respectively which supply the correcting potential to the control circuits of the auxiliary thyratrons AT1 and AT2. The discharge paths V5 and V6 are supplied with anode-cathode potential from an auxiliary direct-current supply AX1 which derives its power from a secondary 2AS5 of the AZ5.

The capacitor CE in series between the output terminals O1 and O2 of the balanced network may be shunted by a resistor 125 which may be connected across it through normally open contacts 127 of the reset relay RRE.

The flip-flop circuit includes preferably a pair of thyratrons AT4 and AT5 each having an anode 131, a cathode 133 and a control electrode 135. The circuit is supplied with power from the direct-current source RXS. The anodes 131 of the thyratrons AT4 and AT5 of the flip-flop circuit are connected through a capacitor CFF and the normally closed contact 137 of a push button PB which is used for setting the circuit. The plate of the capacitor CFF which is connected to the anode 131 of one of thyratrons AT5 is also connected to the positive terminal of the direct-current supply through a pair of resistors 139 and 141. The cathodes 133 of the thyratrons AT4 and AT5 are connected together to the negative terminal of the supply RXS.

The control electrode 135 of one thyratron AT4 is connected through a grid resistor 143 and through a control network CC4 to one plate of a capacitor 145 of a biasing network B5. The control electrode 135 of the other thyratron AT5 is connected through a grid resistor 147 and through a control network CC5 to the other plate of the capacitor 145. The plates of the biasing capacitor are connected to the common junction of the cathodes 133, each through a resistor 149 and 151 respectively. The biasing capacitor 145 is supplied from a secondary 1AS6 of another transformer AZ6 through a rectifier 153 in such a sense that its plate connected to the control electrode 135 of thyratron AT5 is normally positive and its plate connected to the control electrode of the other thyratron AT4 is normally negative.

The control network CC4 connected to thyratron AT4 includes the secondary SC4 of a control transformer TC4 which is connected across a resistor 155 through a rectifier 157 so poled that the terminal of the resistor connected to the control electrode 133 is positive. The control network CC5 connected to the other thyratron AT5 includes the secondary SC5 of a control transformer TC5 which is connected across a capacitor 159 and a resistor 161 in parallel through a rectifier 163. This rectifier is so poled that the terminal of the capacitor resistor network which is connected to the control electrode is negative. In the absence of potential in the secondaries SC4 and SC5 of the control transformers TC4 and TC5, the bias potential supplied by the biasing capacitor 145 prevails and one of the thyratrons AT5 is conductive while the other AT4 is nonconductive. In this condition of the apparatus, the capacitor CFF is charged so that the anode 131 of the nonconductive thyratron AT4 is at a substantially positive potential approximately equal to the potential of the supply RXS.

The anode 131 of the thyratron AT4 is connected to the input terminal A2 of the balance network. The same anode 131 is also connected to the junction of the cathode 87 of path V1 and the resistor 101. The positive terminal of the supply RXS is connected through a resistor 162 to the variable resistor RW or RPH depending on the setting of relay RWP1. It is seen that when thyratron AT5 is conductive A1 and A2 are about at the same potential, and there is substantially no potential across the fixed and variable resistors 101 and RW or RPH. In addition, the control electrodes 109 are at a substantial negative potential.

Since the Regulator Unit is an important component of my invention, it may be well to summarize briefly its principal features. The balanced network formed by the two electric discharge paths V1 and V2 and their associated resistors RB1 and RB2 is controlled by varying the control potential impressed on one of the discharge paths V1. In the event of an unbalance of the bridge, current is conducted to charge the capacitor CE connected across the output terminals O1 and O2 of the network. The change in potential thus produced is transmitted through the double cathode-follower circuit (V5—V6) to the error conductors LE1 and LE2. This is a direct current potential but it varies in magnitude and polarity and controls the phase angle at which the ignitrons I–1 and I–2 are rendered conductive.

The control potential of the controlled discharge path V1, and thus the condition of the balanced network, is dependent on the difference between the welding current dependent potential (CD) and the standard potential (RW–101). In general, the welding current dependent potential (CD) is proportional to the magnitude of the welding current which is flowing through the primary P of the welding transformer. The standard potential is set by the variable resistor RW or RPH.

The polarity and magnitude of the difference between the two potentials which are compared determines the direction and magnitude of the unbalance in the balanced network. The resulting change introduced by the balanced network in the heat control circuit, is such as to increase or decrease the welding current in a sense such as to return the balanced network into balance.

The flip-flop circuit is so connected as to impress and remove the potential from the input terminals A1 and A2 of the balanced network at the beginning and at the end of the interval during which the welding current is flowing. The standard potential is also controlled by the flip-flop circuit in such manner that the welding current dependent potential (CD) and the standard potential are effective only during the intervals during which potential is supplied to the input terminals of the balanced network. The flip-flop action of the flip-flop circuit is so timed that the voltage across the capacitor CD in the potential dependent network is built up before potentials are applied by the flip-flop circuit to the balanced network and to the circuit, including the standard potential.

The anti-parallel discharge paths V3 and V4 in circuit with the capacitor CE across the output terminals of the balanced network is also controlled from the flip-flop circuit. These discharge paths are maintained non-conductive by the flip-flop circuit at all times except during the intervals when the welding current is to flow. The capacitor CE which provides the correcting signal once charged may be prevented from discharging to any substantial extent. This is of advantage where interrupted spot welding is being carried out and the welding current during each weld flows during a successive number of intermittent intervals called "heat" intervals, separated by intervening intervals during which current does not flow which are called "cool" intervals. It is also of advantage in seam welding where "heat" and cool times are produced in succession. In either case the capacitor CE may be prevented from discharging during "cool" times and thus the setting remains unchanged for repeated pulsations or repeated welds. If desired for other purposes the capacitor CE may of course be quickly discharged by operation of reset relay RRE.

The Control Unit includes a thyratron circuit which supplies potential to control the operation of the flip-flop circuit and another thyratron circuit which controls the instantaneous operation of the reset relay.

The former thyratron circuit includes a thyratron AT6 having an anode 181, a cathode 183 and a control electrode 185. This thyratron circuit is supplied from another of the secondaries 2AS6 of the transformer AZ6. Its anode 181 is connected to one terminal of the secondary 2AS6 through a rectifier 187 and through the primary PC4 of the control transformer TC4 associated with one of the flip-flop thyratrons AT4; its anodes 181 is also connected to the other terminal of the secondary 2AS6 through another rectifier 189 and through the primary PC5 of the other control transformer TC5 which controls the other thyratrons AT5 of the flip-flop circuit. The cathode 183 of the thyratron AT6 is connected through resistors 191 and 193 of equal magnitude to the terminals of the secondary winding 2AS6. The rectifiers 187 and 189 are connected in opposition and the thyratron is capable of conducting during alternate half periods of the potential supplied by the secondary 2AS6 through one or the other of the rectifiers and the associated cathode resistor 191 or 193. The control electrode 185 of the thyratron AT6 is connected through a grid resistor 195 and through the "on" contacts 197 and 199 of an "off-on" switch to the bus AL2. The cathode 183 is connected to the anode of the weld thyratron WT of the Sequence Timer through a biasing network B6 which consists of a resistor 201 shunted by a capacitor 203, the shunt network being supplied from the secondary 3AS6 of transformer AZ6.

In the quiescent or standby condition the thyratron AT6 is maintained nonconductive by the bias B6.

The other thyratron circuit includes a thyratron AT7 having an anode 205, a cathode 207 and a control electrode 209. The thyratron is supplied with power from the primary AP6 of the transformer AZ6. The anode 205 is connected to one terminal of the primary AP6 through the coil 214 of the reset relay RRE and the cathode 207 is connected to the other terminal of the primary AP6. The coil 211 is shunted by a rectifier 213 in series with a resistor 215 to prevent its dropping out, once the thyratron AT6 is rendered conductive, during half periods during which the thyratron is nonconductive. The control electrode 209 is connected to the cathode 207 of the thyratron AT6 through a grid resistor 217 and through a pair of additional resistors 219 and 221 respectively. Across one of these resistors a biasing network B7 is connected. The network B7 includes a capacitor 223 and a pair of resistors 225 and 227. The capacitor is charged from still another transformer AZ7 through a rectifier 229 so that its plate electrically nearest the cathode 207 is positive and its other plate is negative. The positive plate of the capacitor 223 is connected through normally closed contacts 231 and 233 of the weld-post-heat relay RWP1 to one of the plates each of a pair of capacitors 235 and 237. The other plates of the capacitor 235 and 237 are connected to the negative terminal of the biasing capacitor 223 through one one of the resistors 225. The weld-post-heat relay RWP1 is provided with additional normally open contacts 239 and 241 which during an operation of the weld-post-heat relay RWP1, connect the capacitors 235 and 237 to be discharged through one of the resistors 219 in series with the control electrode 209 and through still another resistor 243. The thyratron is maintained nonconductive in the quiescent condition of the apparatus by the bias B7. On operation of the weld-post-heat relay RWP1, the bias potential is counteracted by the potential on the capacitors and the thyratron becomes conductive, momentarily actuating the reset relay for a short time interval so that the regulator may be reset for operation during the post heat interval. The capacitors 235 and 237 and their discharge resistors 243 and 219 are so dimensioned that the discharge takes place in a relatively short time interval of the order of a period of power supply and thyratron AT7 is conductive instantaneously for only a short interval. This interval is sufficiently long to enable relay RRE to operate and discharge capacitors CE and CD. Relay RRE has an additional contact 251 which is closed to connect the zero setting bias B8 directly between the control electrode 89 and the cathode 87 of path V1.

The Sequence Timer is preferably, although not necessarily, of the type disclosed in Fig. 1A of application Serial No. 272,818, filed February 21, 1952, to Clarence B. Stadum, Hubert W. Van Ness and Edward C. Hartwig. This Sequence Timer is particularly conceived for a spot welder and times the various events which occur during a spot weld. The present invention concerns itself only with the operation during a weld interval and for this purpose it is only necessary that the operation of the weld thyratron WT and its associated components of the Sequence Timer, be considered. To facilitate the explanation, the components of the Sequence Timer shown in this application are labeled in the same manner as the corresponding components of the Sequence Timer disclosed in application Serial No. 272,818.

The portion of the Sequence Timer under consideration includes the weld thyratron WT which has an anode 259, a cathode 260, a first control electrode 359 and a second control electrode 370. Between the first control electrode 359 and the cathode 260, a time constant network AN4 is connected through a grid resistor 364. This network includes a capacitor 355 and a resistor 351 interconnected through the secondary windings HSW of the heater transformer for the thyratron WT. The second control electrode 370 is connected to the cathode 260 through a time constant network (shown only in application Serial No. 272,818) through the grid resistor 372.

The portion of the Sequence Timer involved in the present invention also includes a double diode D2 having a pair of anodes 352 and 362 and a cathode 354. Between one section 354—352 of the double diode, the weld network WN is connected. This network includes resistor 267, resistor 270, which may be shunted by a switch, and variable resistor 269, all of which are connected in series and shunt capacitor 265.

The circuit shown also includes the hold thyratron HT which has an anode 376, a cathode 273, and a control electrode 271. The weld network WN is connected between the control electrode 271 and cathode 273 through a grid resistor 281.

The anode 259 of the weld thyratron WT is connected to the cathode 183 of the thyratron AT6 which controls the flip-flop circuit through the associated biasing network B6. This anode is also connected through resistor 401 to the time constant network AN9 in the control circuit of the common thyratron AT3 of the Welding Unit. The cathode of the weld thyratron is connected to the auxiliary conductor AL2.

*Stand-by*

In the stand-by condition of the apparatus, the main power circuit breakers (not shown) of the apparatus are closed and power is supplied to the components. The cathodes of the discharge paths and the thyratrons are heated and the apparatus is in conditon to operate.

In addition, the weld-no-weld switch WNW is closed and the weld-no-weld relay RWN is actuated so that the anode circuits of the firing thyratrons FT1 and FT2 are closed. As is explained in application 272,818 in the standby condition of the Sequence Timer the weld thyratron WT is nonconductive, the double diode D2 is conductive, and the hold thyratron HT is nonconductive.

The weld-post-heat relay RWP is now deenergized and its contacts are in the position shown in the drawings.

In the standby condition, the thyratron AT6 of the control unit which controls the flip-flop circuit is maintained nonconductive by the biasing circuit B6 connected to its cathode and the other thyratron AT7 of the Control Unit is also maintained nonconductive. The reset relay RRE is then deenergized.

In the Regulator Unit in the standby conditon, thyratron AT5 of the flip-flop circuit is at this point conductive. The upper input terminal A1 of the balanced network is accordingly at the positive potential of the direct-current supply RXS to the flip-flop circuit and the other terminal A2 is at substantially the same potential because the capacitor CFF of the flip-flop circuit is charged with its left-hand plate at the positive potential of the direct-current supply. The output of the balanced network is thus substantially zero. The anti-parallel discharge paths V3 and V4 in series with the output terminals O1 and O2 of the balanced network are biased to nonconductivity by the conduction of the normally conductive thyratron AT5 of the flip-flop circuit. The standard potential is also suppressed and the control potential of path V1 is at its zero setting. That is the setting at which the output of the balanced network is zero.

The conductors LE1 and LE2 through which the error correcting potential is supplied from the double cathode follower in the standby condition of the apparatus impresses substantially zero potential so that the heat control circuit of the Weld Unit if it became effective would render the ignitrons conductive at instants in the half periods of the supply for which it is set independently of variations in the power cource or in other components which might cause a departure from the desired magnitude. At this point, however, the common thyratron AT3 is maintained nonconductive by the bias B3 and the output of the heat-control network is such that the ignitrons are maintained nonconductive.

*Operation*

In the operation of the apparatus, a starting switch (not shown) such as a foot switch associated with the Sequence Timer is actuated. The various components of the Sequence Timer are then actuated as is explained in the application Serial No. 272,818. During this operation a relay, which may be called the starting relay SR, is actuated closing the contact 67 which connects the control electrode 39 of the common thyratron of the Welding Unit to the bus AL2. Thereafter, the Sequence Timer passes through the squeeze interval causing the welding electrodes to be properly engaged with the work. At the end of the squeeze interval, diode D2 is rendered nonconductive and interrupts the charge of the network AN4 in the circuit of the control grid of the weld thyratron WT. The latter accordingly conducts during the half periods of the supply during which its anode 259 is positive relative to its cathode 260. Because the diode D2 is nonconductive, the charging of the weld network WN is interrupted and the capacitor 265 of this network discharges through the resistors 267, 269, 270 in parallel with it during the weld interval. This times the weld interval.

The conduction of the weld thyratron WT causes the capacitor 61 of the time constant network AN9 in the control circuit of the common thyratron AT3 of the Welding Unit to be charged in such a sense as to permit the common thyratron to conduct. The thyratrons AT1 and AT2 associated with the common thyratron AT3 may now conduct beginning at instants in the positive half periods of their supply as determined by the setting of the heat control circuit. These thyratrons AT1 and AT2 then conduct and current flows during each half period through them, through the common thyratron AT3 and through the primary PF of the firing transformer, the secondaries SF1 and SF2 of which are connected in the control circuits of the firing thyratrons FT1 and FT2. These firing thyratrons and their associated ignitrons I–1 and I–2 are then fired at instants corresponding to the setting of the heat control circuit.

At this point, the potential across the error conductors LE1 and LE2 of the Regulator Unit is zero and this unit is not effective; the manner in which the unit becomes effective will now be described.

When the weld thyratron WT conducts, the cathode 183 of the thyratron AT6 which controls the flip-flop circuit is reduced to a low potential. This thyratron AT6 now conducts during succeeding half periods of the supply of the secondary 2AS6. The phase of the potential supplied to the thyratron AT6 is such with reference to the potential supplied to the weld thyratron WT that initially the conduction is through the primary PC5 of the transformer TC5 which controls the normally conductive thyratron AT5 of the flip-flop circuit. This potential causes the capacitor 159 of the control network CC5 of the normally conductive thyratron AT5 to be charged in such a sense as to tend to render this thyratron nonconductive. The thyratron, however, for the present continues to conduct. During the succeeding half period, current is supplied through the thyratron AT6 which controls the flip-flop circuit and through the primary PC4 of the transformer TC4 which controls the other (normally nonconductive) thyratron AT4 of the flip-flop circuit. This potential is of such polarity as to render the latter thyratron AT4 conductive and it immediately conducts connecting the capacitor CFF of the flip-flop circuit to the cathode 133 of the normally conductive thyratron AT5 and causing the latter to become nonconductive.

The flip-flop circuit has then passed from its standby condition to its operating condition. The flip-flop circuit is maintained in its operating condition so long as the weld thyratron WT conducts because during alternate half periods of the secondary 2AS6 the weld thyratron renders thyratron AT6 conducting so that it keeps renewing the charge on the capacitor 159 in the control circuit CC5 and thus prevents the thyratron AT5 from conducting.

With the flip-flop circuit in the operational condition, the thyratron AT4 which is conductive connects the lower output terminal A2 of the balanced network substantially to the negative terminal of the direct-current supply RXS for the flip-flop circuit. Since the positive terminal of this supply is connected to the upper input terminal of the balanced network, the balanced network is now capable of producing output potential. In addition, the standard potential is now impressed across resistors 101 and RW. The control electrodes 109 of the anti-parallel connected valves V3 and V4 in the balanced network have impressed on them the potential of the anode of the nonconductive flip-flop thyratron AT5 and they are capable of conducting so that the capacitor which supplies the output potential of the balanced network may be charged to one polarity or an opposite polarity, depending on the setting of the network.

By this time, the capacitor CD across which the welding current dependent potential is produced has been fully charged and is entirely effective for regulating purposes. A transient effect is thus avoided. The difference between the potential on capacitor CD and the standard potential (101–RW) is now impressed in path V1 and the capacitor CE is charged depending on the impedance of path V1 so that a difference in potential appears across the resistors 121 and 123 of the double cathode follower (V5—V6) is a potential of one polarity or of the opposite polarity. This difference results in between the conductors LE1 and LE2 in the control circuits of the auxiliary thyratrons AT1 and AT2 which supply the heat control pulses. The instants in the half periods of the supply when these thyratrons AT1 and AT2 are rendered conductive is now set corresponding to the relationship between the standard potential (101–RW) and the welding current dependent potential (CD) and the desired regulating effect is produced so that the ignitron current is maintained at the desired magnitude.

In situations in which current supplied for welding does not include a post heat component the above-described operation with the welding current regulated now continues until the capacitor 265 in the weld network WN is discharged sufficiently to time out the weld time. At this point, the hold thyratron HT is rendered conductive, charging a capacitor (not shown) connected to the control electrode 370 of the weld thyratron WT and rendering the latter nonconductive.

The current for charging the capacitor 61 in the control circuit AN9 of the common thyratron AT3 is now removed. But, as the charge on this capacitor 61 is dissipated through the parallel resistor 63 and this resistor is so set that the common thyratron continues to conduct for the remainder of the cycle during which the weld thyratron WT was rendered nonconductive. Thereafter, the common thyratron AT3 becomes nonconductive and its associated thyratrons AT1 and AT2 become nonconductive so that the firing of the ignitrons I–1 and I–2 is interrupted and the weld interval is at an end.

When the weld thyratron WT becomes nonconductive, the thyratron AT6 which controls the flip-flop circuit becomes nonconductive and the normally conductive thyratron AT5 of the flip-flop circuit is permitted to conduct to reset the flip-flop circuit in the standby condition. The standard potential (101–RW) and the welding current dependent potential (CD) are now blocked, the potential across the input terminals A1 and A2 of the balanced network is reduced to substantially zero, and the anti-parallel connected valves V3 and V4 in this balanced network are rendered nonconductive. The apparatus is now reset to its standby condition except that the capacitor CE in the balanced network continues to remain charged. The sequence timer now passes through its cycle and another cycle may be reinitiated.

If a series of repetitive welding cycles are initiated, the blocking of the anti-parallel connected valves in the balanced network has the advantage that the capacitor CE remains charged and the fluctuation in the current conducted by the ignitrons is minimized during successive welds. This feature is of particular advantage in a seam welder.

Thus far, the welding operation described has been one in which the welding current does not include a post-heat component. If a post-heat component is included, the relay RWP1 and its associated thyratron come into operation. This relay is analogous to the relay RWP of application Ser. No. 272,818 and its operation is similar to the latter. That is, the relay RWP1 is actuated a predetermined time interval after thyratron WT has started to conduct and while it is still conducting and it continues to remain actuated during the remainder of the welding interval.

On operation of the relay RWP1 the variable resistor RW is disconnected from the standard potential network by the opening of contact 81 and the variable resistor RPH is connected in this network by the closing of contact 83. In addition, contacts 231 and 233 in the control circuit of thyratron AT7 are opened and contacts 239 and 241 closed. The capacitors 235 and 237 in this control circuit are disconnected from the biasing network B7 and are connected across parallel resistors 219 and 243 which permit these capacitors to discharge in a very short time interval. During this interval, thyratron AT7 is conductive, energizing the reset relay RRE so that its contacts are closed and the capacitors CD through which the welding current dependent potential is supplied and the capacitor CE of the balanced network are discharged. The capacitors CD and CE are now recharged so that the ignitrons are rendered conductive later in the half periods of the supply than heretofore and the post-heat effect is produced.

At the end of this latter post-heat interval when the thyratron WT is rendered conductive, the relay RWP1 is also deenergized and the apparatus is reset for another operation. When the relay RWP1 becomes deenergized, its contacts 231, 233, 239, 241 in the control circuit of the thyratron AT7 are operated connecting the capacitors 235 and 237 again to the positive terminal of the bias network B7, a charging surge now flows through these capacitors again to render the thyratron AT7 conductive momentarily. The reset relay RRE is then momentarily energized to reset the capacitors CD and EE in the Regulator Unit.

*Operative system*

A system which I have found to operate satisfactorily includes components having the following magnitudes:

WELDING UNIT

| Component | Value |
|---|---|
| Ignitrons I–1 and I–2 | Of rating required for load. |
| Firing thyratrons FT1 and FT2 | WL–5683. |
| Firing thyratrons biasing secondaries 1AS1, 2AS1 | 45 volts. |
| Firing thyratrons biasing capacitors 19, 21 | 1 microfarad. |
| Resistors 23, 25 | Shunting biasing capacitors 47,000. |
| Firing transformer primary PF | 115 volts; secondaries, 230 volts. |
| Resistors 31, 33 | Across firing secondaries, 22,000 ohms. |
| Grid resistors 27, 29 | 1 megohm. |
| Thyratrons AT1, AT2, AT3 | Of heat control circuit, WL–2050. |
| Supply secondary 1AS2 | For heat control thyratrons, 115 volts from each center tap. |
| Resistor 45 | In series with primary of firing transformer, 2000 ohms (10 watts). |
| Secondary 2AS2 heat control transformer AZ2 | 57 volts from each center tap. |
| First heat control variable resistor PR1 | 5000 ohms. |
| Second heat control variable resistor PR2 | 10,000 ohms. |
| Fixed heat control resistor 47 | 15,000 ohms. |
| Resistors across heat control network 51, 55 | 47,000 ohms. |
| Grid resistors 49, 53 | 47,000. |
| Biasing secondary 3AS2 common thyratron AT3 | 20 volts. |
| Biasing capacitor 57 | 1 microfarad. |
| Biasing resistor 59 | 47,000 ohms. |
| Capacitor 61 | In time constant network AN9, .5 microfarad. |
| Resistor 63 | In time constant network, 10,000 ohms. |
| Grid resistor | .1 megohm. |
| Resistor 401 | For conducting current from sequence timer, 100 ohms. |

REGULATOR UNIT

| Component | Value |
|---|---|
| Secondary 1AS4 | 115 volts from each center tap. |
| Capacitor 90 | 2 microfarads. |
| Resistor 403 | 4700 ohms. |
| Regulator TR | VR–75. |
| Resistor 79 | .15 megohm. |
| Variable resistor 92 | 50,000 ohms. |
| Welding current dependent variable resistors 69, 71 | 5 ohms. |
| Current transformer | Produces about 25 volts across its terminals for a normal welding current. |

REGULATOR UNIT—Continued

| | |
|---|---|
| Welding current dependent rectifier | 6X5. |
| Welding current dependent capacitor CD | .5 microfarad. |
| Welding current dependent resistor 73 | .22 megohm. |
| Standard potential fixed resistor 101 | 12,000 ohms. |
| Standard potential variable resistor | 50,000 ohms. |
| Fixed resistor 405 | .1 megohm. |
| Discharge valves V1 and V2 | Balance network, 6SN7. |
| Biasing secondary 1AS5 | One valve V2, 12 volts. |
| Biasing capacitor 93 | 2 microfarads. |
| Biasing resistor 95 | .1 megohm. |
| Grid resistor 97 | .1 megohm. |
| Resistors RB1 and RB2 balanced network | 5000 ohms (10 watts). |
| Output capacitor CE balanced network | 8 microfarads. |
| Shunting resistor 125 | 100 ohms. |
| Anti-parallel discharge paths V3 and V4 | 6SN7. |
| Grid resistors 171 and 173 anti-parallel paths | .22 megohm. |
| Cathode followers V5, V6 | 6SN7. |
| Grid resistors 111, 113 cathode followers | 1 megohm. |
| Output resistors 121, 123 cathode followers | 10,000 ohms. |
| Secondary 2AS5 power supply cathode followers | 220 volts from center tap. |
| Rectifier 407 power supply | 6X5. |
| Capacitor 409 power supply | 2 microfarads. |
| Regulator TR1 | VR-150. |
| Power-supply CRXS secondary 2AS5 | 250 volts from center tap. |
| Rectifier 411 power supply (RXS) | 6X5. |
| Capacitor 413 power supply (RXS) | 4 microfarads. |
| Resistor 141 output flip-flop circuit | 5000 ohms (10 watts). |
| Resistor 139 output flip-flop circuit | 7500 ohms (10 watts). |
| Capacitor CFF flip-flop circuit | .25 microfarad. |
| Thyratrons AT4, AT5 flip-flop circuit | WL-2050. |
| Biasing secondary 1AS6 flip-flop circuit | 55 volts. |
| Biasing capacitor 145 flip-flop circuit | 1 microfarad. |
| Resistor 151 | 22,000 ohms. |
| Resistor 149 | 47,000 ohms. |
| Capacitor 159 | 1 microfarad. |
| Resistor 161 | 22,000 ohms. |
| Resistor 155 | 22,000 ohms. |
| Grid resistors 143, 147 flip-flop thyratrons | 1 megohm. |
| Resistor 163 power supply flip-flop circuit | 7500 ohms (10 watts). |

CONTROL UNIT

| | |
|---|---|
| Thyratron AT6 controlling flip-flop circuit | WL-2050. |
| Secondary 2AS6 power supply for thyratron | 115 volts. |
| Resistors 191 and 193 connected to cathode thyratron | 47,000 ohms. |
| Grid capacitor 415 | .002 microfarad. |
| Grid resistor 195 | .1 megohm. |
| Biasing secondary 3AS6 | 20 volts. |
| Biasing capacitor 203 | 1 microfarad. |
| Biasing resistor 201 | 47,000 ohms. |
| Reset thyratron | WL-2050. |
| Biasing secondary AS7 reset circuit | 115 volts. |
| Biasing capacitor 223 | 1 microfarad. |
| Resistor 227 between cathode and one plate of a capacitor | 47,000 ohms. |
| Resistor 219 from other plate capacitor | 100 ohms. |
| Resistor 221 between cathode and last-named resistor | 47,000 ohms. |
| Capacitor 237 for firing thyratron | 1 microfarad. |
| Capacitor 235 for firing thyratron | .5 microfarad. |
| Resistor 219 shunting capacitor 235 | 15,000 ohms. |
| Resistor 243 connected to other capacitor | 100 ohms. |
| Grid resistor 217 | .1 megohm. |

The Sequence Timer is of the type disclosed in application Ser. No. 272,818 and need not be described in detail here.

It is to be noted that the above description except for a few exceptions does not include surge suppressing capacitors. These capacitors are included in apparatus of this type and are ordinarily of the order of .001 to .002 microfarad.

General comments

The Regulator Unit of apparatus in accordance with my invention is highly flexible. Thus its operation may be such that the welding current may build up from a magnitude corresponding to the initial setting of the heat-control circuit to a magnitude corresponding to the setting of the variable resistor RW in the standard potential circuit. This feature may be used to produce a preheat effect. In carrying out this aspect of my invention, the heat control circuit is set so that the ignitrons I-1 and I-2 are initially rendered conductive late in the half periods of the supply and the standard potential is set to cause the ignitrons to be rendered conductive gradually earlier in the half periods of the supply during the weld interval.

It is seen that I have provided welding apparatus which operates to supply welding current at a substantially constant magnitude or a magnitude which varies as desired in spite of the fact that the welding current flows only intermittently. In carrying out my invention in its comprehensive aspects, I have provided a novel balanced network, a novel flip-flop circuit and other related novel circuits.

While I have shown and described a certain specific embodiment of my invention, many modifications thereof are conceivable. My invention, therefore, is not to be restricted except insofar as is necessitated by the spirit of the prior art.

I claim as my invention:

1. In combination, a balanced network having a first output terminal and a second output terminal; a first cathode-follower network, said first follower network including a discharge device having a control electrode, an anode and a cathode and a third output terminal connected to said cathode; means connecting said first terminal to said control electrode; a second cathode-follower network, said second follower network including a discharge device having a control electrode, an anode and a cathode and including a fourth output terminal connected to said last-named cathode; means connecting said second terminal to said last-named control electrode and means connecting said cathodes to a point electrically intermediate said first and second terminals.

2. In combination, a first electric discharge device having an anode, a cathode and a control electrode; a second electric discharge device having an anode, a cathode and a control electrode; means for connecting said anodes, cathodes and control electrodes in a flip-flop circuit, means in said circuit for impressing a potential tending to maintain said first device conductive and said second device nonconductive; means for supplying a periodic potential; means coupled to said supply means for impressing potentials between said control electrode and cathode of said first device during alternate periods of said periodic potential tending to maintain said first device nonconductive; and means coupled to said supply means for impressing potentials between said control electrode and cathode of said second device during the intervening periods of said periodic potential tending to render said second device conductive.

3. In combination, a first electric discharge device having an anode, a cathode and a control electrode; a second electric discharge device having an anode, a cathode and a control electrode; means for connecting said anodes, cathodes and control electrodes in a flip-flop circuit, means in said circuit for impressing a potential tending to maintain said first device conducting and said second device nonconducting; means for supplying a periodic potential; means coupled to said supply means for impressing potentials between said control electrode and cathode of said first device during alternate periods of said periodic potential tending to maintain said first device nonconductive, said coupled means including means for causing the effect of the said potentials impressed by said coupled means to persist after said last-named potentials have been interrupted, and means coupled to said supply electrode and cathode of said second device during the intervening periods of said periodic potential tending to render said second device conducting.

4. In combination in a regulator for apparatus for supplying current during a predetermined interval of time, means for producing a first potential dependent on the magnitude of said current and having a first output terminal and a second output terminal; means for producing a standard potential having a third output terminal and a fourth output terminal; a balanced network having an arm of variable impedance, a first input terminal, a second input terminal and a fifth output terminal and a sixth output terminal; means for connecting said first, second, third and fourth output terminals in circuit with said impedance for varying said impedance; a flip-flop circuit having a first condition and a second condition and being normally in said first condition and including a first electric discharge device having an electrode circuit defining a seventh output terminal and an electric discharge device having an electrode circuit defining an eighth output terminal; means for connecting said seventh output terminal to said first input terminal; means for connecting said seventh output terminal to said first output terminal; means for connecting said eighth output terminal to said second input terminal; means for connecting said eighth output terminal to said second output terminal; and means connected to said fifth and sixth output terminals for controlling said current.

5. In combination, an electric discharge device having a control electrode, an anode and a cathode; a biasing supply having a positive terminal and a negative terminal; a resistor; a capacitor; means for connecting in series said cathode, said supply, said resistor and said control electrode with said positive terminal electrically nearer the cathode than the control electrode; switch means normally connecting in series said supply and said capacitor; and means for actuating said switch means to disconnect said capacitor from said series connection and to connect it in parallel with said resistor with the plate of said capacitor which was connected to said positive terminal electrically nearer said control electrode than said cathode.

6. In combination, a balanced network having a plurality of interconnected impedance arms and having input and output terminals at the junctions of said arms, means for impressing a potential between said input terminals, a capacitor, a pair of discharge paths each defined by an anode and a cathode connected in anti-parallel, and means connecting said capacitor and said paths between said output terminals.

7. In combination, a balanced network having a plurality of interconnected impedance arms and having input and output terminals at the junctions of said arms, means for impressing a potential between said input terminals, a capacitor, a pair of discharge paths each defined by an anode and a cathode and having a control electrode, means connecting said anodes and cathodes in anti-parallel, means connecting said capacitor and said paths between said output terminals, and means for impressing a blocking potential on said control electrodes in the stand-by condition of said network.

8. A flip-flop circuit including a first gaseous electric discharge device having an anode, a cathode, and a control electrode; a second gaseous electric discharge device having an anode, a cathode, and a control electrode; a capacitor; means connecting said capacitor between said anodes; a first direct-current supply having a positive terminal and a negative terminal; means connecting said positive terminal to said anode of said first device; means connecting said positive terminal to said anode of said second device; means connecting said negative terminal to said cathodes; a second direct-current supply having a positive terminal and a negative terminal; a first network having a first terminal and a second terminal; means for energizing said network so that said first terminal is negative relative to said second terminal; a second network having a first terminal and a second terminal; means for energizing said second network so that said first terminal is positive relative to said second terminal; and means connecting in series said control electrodes; said second supply and said first and second networks with said positive terminal of said second supply electrically nearer the control electrode of the first device and its negative terminal electrically nearer the control electrode of the second device, the first terminal of said first network electrically nearer the control electrode of the first device and its second terminal electrically nearer the control electrode of the second device, and the first terminal of the second network electrically nearer the control electrode of the second device and the second terminal electrically nearer the control electrode of the first device.

9. In combination, a balanced network having a plurality of interconnected impedance arms and having input and output terminals at respective junctions of said arms, means for impressing a potential between said input terminals whereby a resulting potential dependent on the impedance relationship of said arms exists across said output terminals, means connected between said output terminals and including in series a capacitor and a pair of discharge paths in anti-parallel each path being defined by an anode and a cathode whereby said resulting potential is impressed between said anodes and cathodes and means including a flip-flop network for controlling the conductivity of said paths.

10. In combination in a regulator for power which is supplied intermittently during predetermined time intervals and having timing terminals, power-dependent potential terminals and standard potential terminals, means for impressing a timing signal on said timing terminals during said intervals, means responsive to said power for impressing a potential dependent on said power on said power-dependent terminals, means for impressing a standard potential on said standard potential terminals, means connected to said power-dependent potential terminals and said standard potential terminals and responsive to the relationship between the magnitudes of said dependent potential and said standard potential for deriving an error correcting signal for said power, and means connected to said timing terminals and to said standard potential terminals and responsive to said timing signal for suppressing said error correcting signal until a predetermined time interval after said timing signal has been initiated.

11. A regulator for apparatus in which load current is supplied only during a predetermined interval comprising means for producing a timing signal for timing said interval, means for producing a potential dependent on the magnitude of said current, means for producing a standard potential, means connected to said dependent potential producing means and to said standard-potential producing means and responsive to the magnitude relationship between said dependent potential and said standard potential and adapted to be connected to said apparatus for changing said current in accordance with said relationship, and means connected to said signal producing means and to said responsive means for blocking the aforesaid operation of said responsive means until a second predetermined time interval after said timing signal has been initiated.

12. A regulator for apparatus in which load current is supplied only during a predetermined interval comprising means for producing a timing signal for timing said interval, means for producing a potential dependent on the magnitude of said current, said dependent potential building up to full value in a second predetermined time interval, means for producing a standard potential, means connected to said dependent-potential producing means and to said standard-potential producing means and responsive to the magnitude relationship between said dependent potential and said standard potential and adapted to be connected to said apparatus for changing said current in accordance with said relationship, and means connected to said timing signal producing means for blocking the aforesaid operation of said responsive means until a third predetermined time interval after said timing signal has been initiated, which third interval is at least as long as said second interval.

13. In combination in a regulator for electrical power that is supplied during intermittent intervals of predetermined duration, means for producing a potential dependent on the magnitude of said power; means for supplying a standard potential; a balanced network having arms of variable impedance, input terminals and output terminals; means connected to said dependent-potential producing means and to said standard potential producing means and responsive to the magnitude relationship between said dependent potential and said standard potential for varying the impedance of said arms in dependence upon said relationship; timing means for timing said duration of said intermittent intervals; and means connected to said timing means for blocking said standard potential in the stand-by condition of said regulator and for permitting said standard potential to be impressed a predetermined time interval after the initiation of the timing operation of said timing means.

14. In combination in a regulator for electrical power that is supplied during intermittent intervals of predetermined duration, means for producing a potential dependent on the magnitude of said power; means for supplying a standard potential; a balanced network having arms of variable impedance, input terminals and output terminals; means connected to said dependent-potential producing means and to said standard-potential producing means and responsive to the magnitude relationship between said dependent potential and said standard potential for varying the impedance of said arms in dependence upon said relationship; timing means for timing said duration of said intermittent intervals; means connected to said timing means for blocking said standard potential in the stand-by condition of said regulator and for permitting said standard potential to be impressed a predetermined time interval after the initiation of the timing operation of said timing means, and means connected to said timing means for impressing between said input terminals a difference of potential only following a predetermined time interval after the initiation of the timing operation of said timing means.

15. In combination in a regulator for apparatus for supplying current during a predetermined interval of time, means for producing a first potential dependent on the magnitude of said current and having a first output terminal and a second output terminal; means for producing a standard potential having a third output terminal and a fourth output terminal; a balanced network having an arm of variable impedance, a first input terminal, a second input terminal and a fifth output terminal and a sixth output terminal; means for connecting said first, second, third and fourth output terminals in circuit with said impedance for varying said impedance; a flip-flop circuit having a first condition and a second condition and being normally in said first condition and including a first electric discharge device having an electrode circuit defining a seventh output terminal and an electric discharge device having an electrode circuit defining an eighth output terminal; means for connecting said seventh output terminal to said first input terminal; means for connecting said seventh output terminal to said first output terminal; means for connecting said eighth output terminal to said second input terminal; means for connecting said eighth output terminal to said second output terminal; means connected to said fifth and sixth output terminals for controlling said current; means for producing a timing signal and for timing the duration of said signal; and means responsive to the initiation of said timing signal for causing said flip-flop circuit to flop from said first condition to said second condition.

16. In combination, a balanced network having a plurality of interconnected impedance arms and having input and output terminals at the junctions of said arms, means for impressing a potential between said input terminals, a capacitor, a pair of discharge paths each defined by an anode and a cathode and having a control electrode, means connecting said anodes and cathodes in antiparallel, means connecting said capacitor and said paths between said output terminals, and means including a flip-flop network connected to said control electrodes for controlling the conductivity of said paths, said controlling means impressing a blocking potential on said control electrodes in the stand-by condition of said network.

17. The combination including a flip-flop circuit including a first gaseous electric discharge device having an anode, a cathode, and a control electrode; a second gaseous electric discharge device having an anode, a cathode, and a control electrode; a capacitor; means connecting said capacitor between said anodes; a first direct-current supply having a positive terminal and a negative terminal; means connecting said positive terminal to said anode of said first device; means connecting said positive terminal to said anode of said second device; means connecting said negative terminal to said cathodes; a second direct-current supply having a positive terminal and a negative terminal; a first network having a first terminal and a second terminal; means for energizing said network so that said first terminal is negative relative to said second terminal; a second network having a first terminal and a second terminal; means for energizing said second network so that said first terminal is positive relative to said second terminal; and means connecting in series said control electrodes; said second supply and said first and second networks with said positive terminal of said second supply electrically nearer the control electrode of the first device and its negative terminal electrically nearer the control electrode of the second device, the first terminal of said first network electrically nearer the control electrode of the first device and its second terminal electrically nearer the control electrode of the second device, and the first terminal of the second network electrically nearer the control electrode of the second device and the second terminal electrically nearer the control electrode of the first device; and actuating means for said energizing means for said first and second networks operable to actuate said respective networks alternately.

18. A flip-flop circuit including a first gaseous electric discharge device having an anode, a cathode, and a control electrode; a second gaseous electric discharge device having an anode, a cathode, and a control electrode; a capacitor; means connecting said capacitor between said anodes; a first direct-current supply having a positive terminal and a negative terminal; means connecting said positive terminal to said anode of said first device; means connecting said positive terminal of said anode of said second device; means connecting said negative terminal to said cathodes; a second direct-current supply having a positive terminal and a negative terminal; a first network having a first terminal and a second terminal; means for energizing said network so that first terminal is negative relative to said second terminal, said first network including means for maintaining said first terminal negative relative to said second terminal for a predetermined time interval after the operation of said energizing means; a second network having a first terminal and a second terminal; means for energizing said second network so that said first terminal is positive relative to said second terminal; and means connecting in series said control electrodes; said second supply and said first and second networks with said positive terminal of said second supply electrically nearer the control electrode of the first device and its negative terminal electrically nearer the control electrode of the second device, the first terminal of said first network electrically nearer the control electrode of the first device and its second terminal electrically nearer the control electrode of the second device, and the first terminal of the second network electrically nearer the control electrode of the second device and the second terminal electrically nearer the control electrode of the first device.

References Cited in the file of this patent

UNITED STATES PATENTS

| | | |
|---|---|---|
| 2,059,562 | Curtis et al. | Nov. 3, 1936 |
| 2,299,272 | Hallden | Oct. 20, 1942 |
| 2,366,038 | Livingston | Dec. 26, 1944 |
| 2,440,932 | Cooper et al. | May 4, 1948 |
| 2,562,744 | Schultz | July 31, 1951 |